(12) United States Patent
Willemsen et al.

(10) Patent No.: US 11,564,403 B2
(45) Date of Patent: *Jan. 31, 2023

(54) SOLUBLE RAPESEED PROTEIN ISOLATE

(71) Applicant: DSM IP ASSETS B.V., Heerlen (NL)

(72) Inventors: Johannes Hendrikus Maria Willemsen, Echt (NL); Johannes Hendrikus Antonius Jeroen Vermunt, Echt (NL); Nienke Nina Hylkema, Echt (NL); Gerardus Johannes Franciscus Smolders, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 199 days.

This patent is subject to a terminal disclaimer.

(21) Appl. No.: 16/315,060

(22) PCT Filed: Jul. 6, 2017

(86) PCT No.: PCT/EP2017/066872
§ 371 (c)(1),
(2) Date: Jan. 3, 2019

(87) PCT Pub. No.: WO2018/007493
PCT Pub. Date: Jan. 11, 2018

(65) Prior Publication Data
US 2019/0150473 A1    May 23, 2019

(30) Foreign Application Priority Data

Jul. 7, 2016   (EP) ..................................... 16178343
Apr. 19, 2017  (EP) ..................................... 17166992

(51) Int. Cl.
*A23J 1/14*   (2006.01)
*A23J 3/14*   (2006.01)
(Continued)

(52) U.S. Cl.
CPC .................. *A23J 1/14* (2013.01); *A23G 1/44* (2013.01); *A23J 3/14* (2013.01); *A23K 20/147* (2016.05);
(Continued)

(58) Field of Classification Search
CPC .... A23J 1/14; A23J 1/142; A23J 1/144; A23J 1/146; A23J 1/148; A23J 3/14; A23K 20/147; A23K 50/40
See application file for complete search history.

(56) References Cited

U.S. PATENT DOCUMENTS 2,861,061 A   11/1958   Borel
2,861,062 A   11/1958   Borel
(Continued)

FOREIGN PATENT DOCUMENTS

CA        2954314 A1      10/2015
DE    102014005466 A1 *   10/2015    ............. B01D 11/02
(Continued)

OTHER PUBLICATIONS

Nickerson, "Development of Formulated Canola Protein-based Ingredients for the Food Industry", Final Report: Apr. 2014, Project Code: CUP SCDC Sep. 2010, pp. 1-342. (Year: 2014).*
(Continued)

*Primary Examiner* — Changqing Li
(74) *Attorney, Agent, or Firm* — McBee Moore & Vanik IP, LLC; Susan McBee; Chester Moore

(57) ABSTRACT

The present invention discloses a native rapeseed protein isolate comprising 40 to 65% cruciferins and 35 to 60% napins and having a solubility of at least 88% when measured over a pH range from 3 to 10 at a temperature of 23±2° C.; wherein the native rapeseed protein isolate comprises from 5% to 65% on dry matter of 12S rapeseed protein where the presence of 12S is verified by Blue Native PAGE.

9 Claims, 1 Drawing Sheet

(51) Int. Cl.
  *A23K 20/147*  (2016.01)
  *A23K 50/40*  (2016.01)
  *A23L 11/30*  (2016.01)
  *A23G 1/44*  (2006.01)
  *A23K 20/158*  (2016.01)

(52) U.S. Cl.
  CPC ............ *A23K 20/158* (2016.05); *A23K 50/40* (2016.05); *A23L 11/30* (2016.08); *A23V 2002/00* (2013.01)

(56) References Cited

U.S. PATENT DOCUMENTS

| | | | |
|---|---|---|---|
| 5,844,086 | A | 12/1998 | Murray |
| 6,005,076 | A | 12/1999 | Murray |
| 8,623,445 | B2 * | 1/2014 | Tang .................... A23J 1/14 426/656 |
| 9,115,202 | B2 | 8/2015 | Segall et al. |
| 11,457,644 | B2 * | 10/2022 | Shi ........................ A23J 1/14 |
| 2003/0124241 | A1 * | 7/2003 | Westdal ................ A23K 50/40 426/635 |
| 2004/0039174 | A1 | 2/2004 | Barker et al. |
| 2005/0064086 | A1 | 3/2005 | Hiron et al. |
| 2007/0014914 | A1 | 1/2007 | Borders |
| 2007/0098876 | A1 | 5/2007 | Hiron |
| 2010/0041871 | A1 | 2/2010 | Segall et al. |
| 2010/0068370 | A1 | 3/2010 | Segall et al. |
| 2010/0086662 | A1 | 4/2010 | Cox |
| 2010/0136173 | A1 | 6/2010 | Tang |
| 2014/0256914 | A1 | 9/2014 | Green et al. |
| 2015/0073127 | A1 | 3/2015 | Wnukowski et al. |
| 2015/0272171 | A1 | 10/2015 | Lamacchia |
| 2016/0031950 | A1 | 2/2016 | Jaramillo Freydell et al. |
| 2017/0027190 | A1 * | 2/2017 | During ................ B01D 15/362 |
| 2019/0150473 | A1 | 5/2019 | Willemsen et al. |
| 2019/0254303 | A1 | 8/2019 | Shi et al. |
| 2019/0307149 | A1 | 10/2019 | Willemsen et al. |
| 2019/0307160 | A1 * | 10/2019 | Shi ........................ A23G 3/346 |
| 2020/0015473 | A1 | 1/2020 | Moore et al. |
| 2020/0154732 | A1 | 5/2020 | Shi et al. |
| 2021/0084931 | A1 * | 3/2021 | Vlasie .................... A23J 1/148 |
| 2021/0177005 | A1 * | 6/2021 | Hylkema ................ A23G 9/38 |

FOREIGN PATENT DOCUMENTS

| | | |
|---|---|---|
| DE | 102014005466 A1 | 10/2015 |
| EP | 1389921 A1 | 2/2004 |
| EP | 1715752 A1 | 11/2006 |
| EP | 1720415 A1 | 11/2006 |
| EP | 2364602 A1 | 9/2011 |
| EP | 2736351 A1 | 6/2014 |
| EP | 15200789 | 12/2015 |
| EP | 15200789 A | 12/2015 |
| EP | 17166993 | 4/2016 |
| EP | 16178339 A | 7/2016 |
| EP | 16178340 A | 7/2016 |
| EP | 16178343 | 7/2016 |
| EP | 16178343 A | 7/2016 |
| EP | 16178345 A | 7/2016 |
| EP | 16178347 A | 7/2016 |
| EP | 16178348 A | 7/2016 |
| EP | 17166992 | 4/2017 |
| EP | 3389391 A1 | 10/2018 |
| EP | 3481218 B1 | 5/2019 |
| WO | 02/089598 A1 | 11/2002 |
| WO | 03/034836 A1 | 5/2003 |
| WO | 03/043439 A1 | 5/2003 |
| WO | 2005/067729 A1 | 7/2005 |
| WO | 2005/077201 A1 | 8/2005 |
| WO | 2008/094434 A2 | 8/2008 |
| WO | 2010/003245 A1 | 1/2010 |
| WO | 2013/000066 A1 | 1/2013 |
| WO | 2015/114543 A2 | 8/2015 |
| WO | 2017/102535 A1 | 6/2017 |
| WO | 2018/007490 A1 | 1/2018 |
| WO | 2018/007491 A1 | 1/2018 |
| WO | 2018/007492 A1 | 1/2018 |
| WO | 2018/007493 A1 | 1/2018 |
| WO | 2018/007494 A1 | 1/2018 |
| WO | 2018/007508 A1 | 1/2018 |

OTHER PUBLICATIONS

Fukushima et al., "Denaturation of Soybean Proteins by Organic Solvents", Soybean Protein Denaturation, Mar. 1969, vol. 46, 156-163. (Year: 1969).*
Rezig et al., "Pumpkin (*Cucurbita maxima*) Seed Proteins: Sequential Extraction Processing and Fraction Characterization", Journal of Agricultural and Food Chemistry, 2013, 61(32), 7715-7721. (Year: 2013).*
Akbari, Ali et al., "An integrated method of isolating napin an cruciferin from defatted canola meal", LWT-Food Science and Technology, Jun. 3, 2015, pp. 308-315, vol. 64, No. 1.
Karaca, Asli Can et al., "Emulsifying properties of canola and flaxseed protein isolates produced by isoelectric precipitation and salt extraction", Food Research international, Jul. 8, 2011, pp. 2991-2998, vol. 44, No. 9.
International Search Report of International Patent Application No. PCT/EP2017/066872 dated Sep. 8, 2017.
Morr, C.V. et al., "A Cciiabcrative Study to Develop a Standarized Food Protein Solubility Precedure", Jaurnal of Food Science, 1985, pp. 1715-1718, vol. 50.
Aluko, R.E. et al., "Limited enzymatic proteolysis increases the level of incorporation of canola proteins into mayonnaise", Innovated Food Science and Emerging Technologies, Jun. 1, 2005, pp. 195-202, vol. 6.
Campbell, Lisa et al., "Canola/Rapeseed Protein: Future Opportunities and Directions—Workshop Proceedings of IRC 2015", Plants, Apr. 13, 2016, vol. 5, No. 2.
Gerzhova, Alina et al., "Study of total dry matter and protein extraction from canola meal as affected by the pH, sait addition and use of zeta-potential/turbidimetry analysis to optimize the extraction conditions," Food Chemistry, Elsevier Ltd, NL, vol. 201, Jan. 22, 2016, pp. 243-252, XP029413712.
Wanasundara, Janitha P.D. et al., "Canola/rapeseed protein-functionality and nutrition," OCL, Jul. 1, 2016, vol. 23, No. 4, p. D407, XP055304289.
International Search Report of International Patent Application No. PCT/EP2017/066871 dated Sep. 7, 2017.
International Search Report of International Patent Application No. PCT/EP2017/066908 dated Sep. 11, 2017.
Communication of a Notice of Opposition of European Patent Application No. 17734757.2 dated Feb. 4, 2021.
Krishnamoorthy, Uppoor and John Moran, "Rearing Young Ruminants on Milk Replacers and Starter Feeds", FAO Animal Production and Health Manual, 2011.
Declaration of Kevin Segall dated Jan. 27, 2021.
"Guide to Calf Milk Replacers: Types, Use and Quality", Bovine Alliance on Management & Nutrition (BAMN Publication), 2008.
Nickerson, Michael, "Protein Functionality Testing Manual", 2012, University of Saskatchewan.
Declaration of Kevin Segall dated Dec. 23, 2020.
Hoglund, Anna-Stina et al., "Distribution of Napin and Cruciferin in Developing Rape Seed Embryos", Plant Physiol., 1992, pp. 509-515, vol. 98.
"Annual Information Form for the Year Ended Mar. 31, 2012", Burcon: A New World in Protein, Jun. 25, 2012, pp. 1-74, Burcon Nutrascience Corporation, Vancouver, B.C.
14th International Rapeseed Congress—Abstracts, 2015, pp. 120-147.
Opposition to European Patent Application No. 3481216, dated Mar. 3, 2021.
Notice of Opposition to European Patent Application No. 3481216, dated Mar. 3, 2021.
Letter accompanying subsequently filed items with the Opposition to European Patent Application No. 3481216, dated Mar. 3, 2021.

(56) References Cited

OTHER PUBLICATIONS

Consolidated List of Citations filed items with the Opposition to European Patent Application No. 3481216.
Oral Presentation Themes 119-146 Abstracts, 14th International Rapeseed Congress, Jul. 2015, Canada.
Annual Information Form for the year ended Mar. 31, 2012, Burcon Nutrascience Corporation, Jun. 25, 2012, pp. 1-74.
Anna-Stina Hoglund et al., "Distribution of Napin and Cruciferin in Developing Rape Seed Embryos 1", Plant Physiol., 1992, pp. 509-515, vol. 98, Department of Cell Research, Uppsala Biomedical Center, Swedish University of Agricultural Sciences, Uppsala, Sweden.
Screw Oil Press—gemco-machine.com/Screw-Oil-Press.html.
Kevin Segall, Report about experimentation conducted regarding the rapeseed protein isolates described on EP 3481216 (the opposed patent (OP)) and wo 2013/000066, pp. 1-8.
Acknowledgment of receipt, Submission No. 9560700, Application No. EP17734756.4, European Patent Application No. EP3481216, dated Mar. 3, 2021.
Acknowledgment of receipt, Submission No. 9561629, Application No. EP17734756.4, European Patent Application No. EP3481216, dated Mar. 3, 2021.
Communication of a Notice of Opposition in European Patent Application No. 3481216, dated Mar. 4, 2021.
Communication of a Notice of Opposition in European Patent Application No. 3481216, dated Mar. 10, 2021.
International Search Report of International Patent Application No. PCT/EP2016/080234 dated Feb. 10, 2017, 3 pages.
PCT International Search Report for PCT/EP2017/066869, dated Aug. 8, 2017, 4 pages.
Pudel et al., "Production and properties of rapeseed albumin," Lipid Technology, (2015), vol. 27, No. 5: 112-114.
J. Kroll, "Selected functional properties of detoxified eapeseed protein preparations effected by phytic acid," Die Nahrung—Food, (1991) vol. 35, No. 6: 619-624.
Kroll et al., "Beeinflussung funktioneller Eigenschaften von Proteinen durch gekoppelte mechanolytische und chemische Modifizierung," Die Nahrung—Food, (1984), vol. 28, No. 4: 389-396.
Kodagoda, et al., "Some Functional Properties of Rapeseed Protein Isolates and Concentrates," Can. Inst. Food Sci. Technol. J., (1973), vol. 6, No. 4: 266-269.
"The French have set off a trend of "detoxification" when they eat, and they can't even have gluten," European Times, published Nov. 13, 2015, 7 pages.
Wang, Xiao-hua, "Discussion on the oil making technology of imported rapeseed", Cereals & Oils, Issue 1, pp. 23-24, published on Dec. 31, 1999.
Rebuttal to Kevin Segall declaration submitted in EP opposition, dated Jun. 2, 2021, 1 page.
Decision rejecting opposition in oral proceedings of EP application No. 17735153.3, dated Mar. 9, 2022, 1 page.

\* cited by examiner

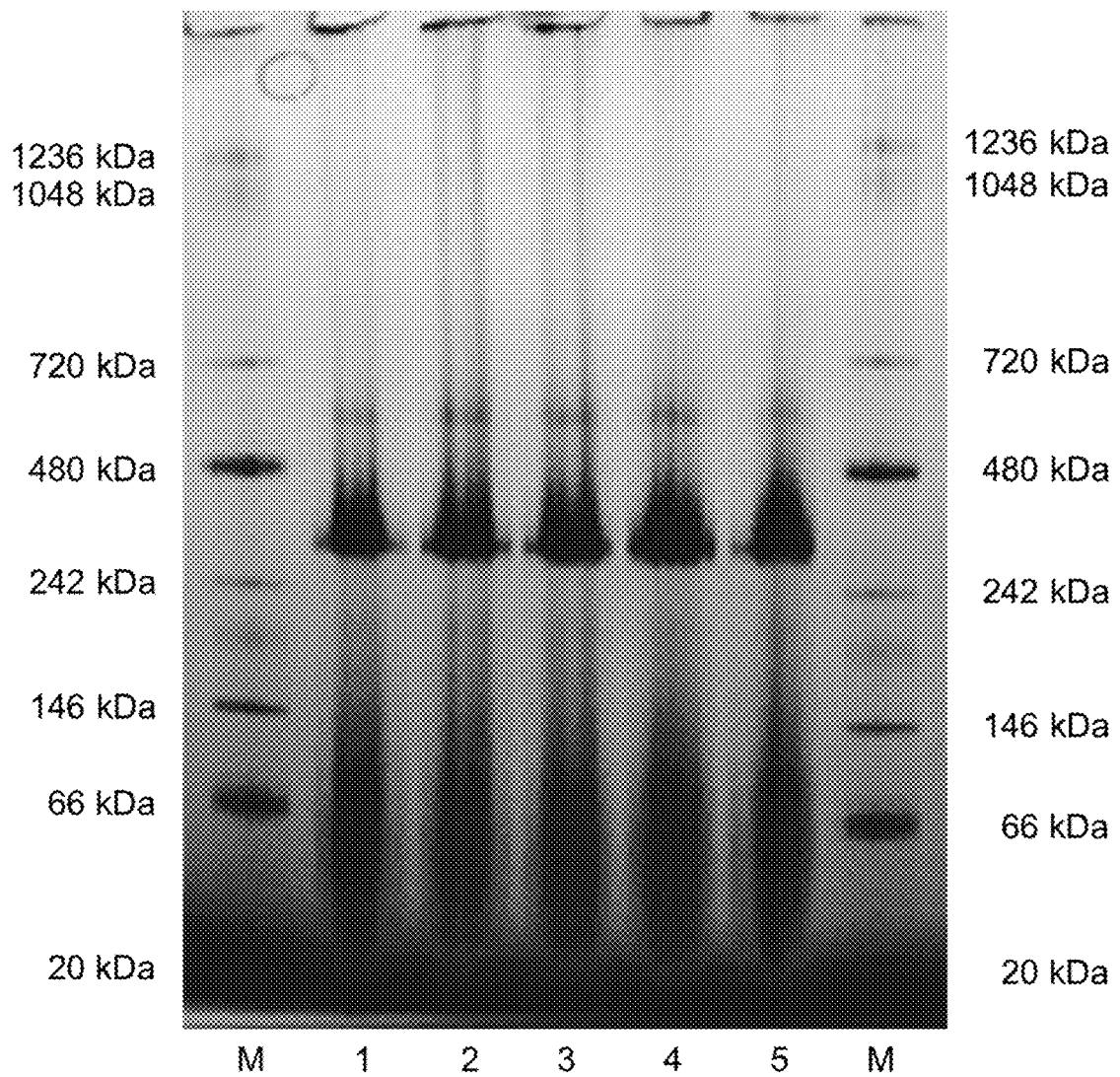

SOLUBLE RAPESEED PROTEIN ISOLATE

CROSS-REFERENCE TO RELATED APPLICATIONS

This application is a National Stage entry of International Application No. PCT/EP2017/066872, filed 6 Jul. 2017, which claims priority to European Patent Application Nos. 16178343.6, filed 7 Jul. 2016, and 17166992.2, filed 19 Apr. 2017.

BACKGROUND

Field Of The Invention

The present invention is directed to a soluble native rapeseed protein isolate and use of the soluble native rapeseed protein isolate in a food product.

Description of Related Art

Protein is a main feature of human nutrition. This may be sourced from animals (e.g. meat, fish, egg, dairy) or vegetables. There is a general desire to reduce the amount of animal based protein.

The use of egg protein is often undesirable. For example, due to problems with egg allergies, medical problems associated with cholesterol levels in eggs, religious restrictions/convictions, culinary preferences (such as, for example, a vegetarian or a vegan diet), cost fluctuations in the price of eggs, use of antibiotics and hormones in poultry production, and diseases associated with poultry (such as, for example, bird flu), the use of alternative proteins may be desired.

The use of vegetable based protein in human nutrition is known, for example WO 2008/094434 discloses the use of wheat protein isolates as an alternative to the use of egg yolk protein in compositions. However, the use of wheat protein isolates may not be desirable for those with gluten allergies. The use of soy based protein instead of whey protein has also been described for example in WO 2014/018922. Soy protein is widely used however in view of some intolerances to soy products there is a need to find other sources of vegetable proteins.

Suitable alternatives include pea protein and rapeseed protein. Rapeseed seeds are rich in oil and contain considerable amounts of protein that accounts for 17 to 25% of seed dry weight. Processing rapeseed for oil for human consumption produces rapeseed meal (60%) as a by-product which contains about 30 to 40% protein. The rapeseed used for this purpose is usually of the varieties *Brassica napus* and *Brassica juncea*. These varieties contain only low levels of erucic acid and glucosinolate, and are also known as Canola. Canola is a contraction of Canada and ola, for "oil low acid", but is now a generic term defined as rapeseed oil comprising <2% erucic acid and <30 mmol/g glucosinolate. The resultant rapeseed meal is currently used as a high-protein animal feed.

Proteins are available as hydrolysates, concentrates and isolates. Hydrolysates are proteins that have been partially broken down by exposing the protein to heat, acid or enzymes that break apart the bonds linking amino acids. This makes it taste more bitter, but also allows it to be absorbed more rapidly during digestion than a native (non-hydrolyzed) protein. Isolates are purer than concentrates, meaning other non-protein components have been partially removed to "isolate" the protein. Many concentrates are around 80% protein, which means that on a dry basis, 80% of the total weight is protein. Isolates are typically around 90% protein (dry basis). This is calculated using the Kjeldahl method.

The predominant storage proteins found in rapeseed are cruciferins and napins. Cruciferins are globulins and are the major storage protein in the seed. It is composed of 6 subunits and has a total molecular weight of approximately 300 kDa. Napins are albumins and are a low molecular weight storage protein with a molecular weight of approximately 14 kDa. Napins are more easily solubilized and in for example EP 1715752B1 a process is disclosed to separate out the more soluble napin fraction, preferably to at least 85 wt. %. Napins are primarily proposed for use used in applications where solubility is key. DE 10 2014 005466 A1 also describes a process for obtaining purified cruciferin and napin fractions. During the process, also a protein mixture of the two with 55-60% napins and 40-45% cruciferins is obtained. The solubility of this protein mixture is approximately 75%.

Rapeseed proteins can be also divided into various fractions according to the corresponding sedimentation coefficient in Svedberg units (S). This coefficient indicates the speed of sedimentation of a macromolecule in a centrifugal field. For rapeseed proteins, the main reported fractions are: 12S, 7S and 2S. Cruciferin and napin are the two major families of storage proteins found in canola/rapeseed. Napin is a 2S albumin, and cruciferin is a 12S globulin. Furthermore, Schwenke and Linow Nahrung (1982) 26, K5-K6) state that reversible dissociation of the 12S globulin from rapeseed (*Brassica napus* L.) depends on ionic strength. The cruciferin complex is present as a 300 kDa 12S hexamer when exposed to higher ionic strength ($\mu \geq 0.5$ mS/cm), and reversibly dissociates into 7S trimeric molecules of 150 kDa when exposed to low ionic strength conditions.

It has been found that high purity rapeseed protein isolate has a broadly-based functionality in food products, unique among proteinaceous materials. The ability to utilize a protein which is vegetable in origin in food products enables truly vegetarian food products to be provided in instances where egg white and/or animal-derived protein have been used in the absence of any available substitute.

The rapeseed protein isolate may be used in conventional applications of protein isolates, such as protein fortification of processed foods, emulsification of oils, body formers in baked foods and foaming agents in products which entrap gases. The rapeseed protein isolate also has functionalities not exhibited by the source material and isoelectric precipitates. The rapeseed protein isolate has certain functionalities including the ability to be formed into protein fibers and the ability to be used as a protein substitute or extender in food products where animal protein or other plant proteins are used. As described herein, the rapeseed protein isolate provided herein has additional functionalities.

EP 1389921B1 discloses a process of forming a food composition, which comprises extracting rapeseed oil seed meal with an aqueous food-grade salt solution at a temperature of at least 5° C. to cause solubilization of protein in the rapeseed oil seed meal and to form an aqueous protein solution having a protein content of 5 to 30 g/l and a pH of 5.0 to 6.8, and subsequently two protein fractions are separated out via micelles. This is done to improve solubility as the 12S fraction is usually considered as less soluble over a wide pH range when not in the presence of a salt. The resultant protein isolate is incorporated in said food composition in substitution for egg white, milk protein, whole egg, meat fibers, or gelatin.

WO 2013/000066 discloses rapeseed protein products having a protein content of at least about 60 wt. % with a low phytic acid content, with a preference for equal portions of 2S and 7S with a minor content of 12S.

EP 1720415 discloses a process for preparing a rapeseed protein isolate for an aquaculture feed composition comprising 25 to 55 wt. % of 2S rapeseed protein, 47 to 75 wt. % of 7S rapeseed protein and 0 to 15 wt. % of 12S rapeseed protein. This process requires the use of high levels of salt, which is of no issue in aquaculture but not suitable for human nutrition.

We have found that in our process there is no need to separate out the protein constituents and yet a solubility across a broader pH range can be maintained.

It has been found that the use of soluble native rapeseed protein isolate comprising both cruciferins and napins, obtained from cold pressed oilseed meal and extracted and mild conditions gave surprisingly good results when used to replace other proteins fully or partially.

BRIEF DESCRIPTION OF THE DRAWINGS

FIG. 1 shows Blue Native PAGE gels applied to rapeseed protein isolates from different batches. The gels were stained with Simply Blue and scanned with the Spot Cutter.

DETAILED DESCRIPTION OF A PREFERRED EMBODIMENT

In a first aspect of the invention, there is provided a native rapeseed protein isolate comprising 40 to 65% cruciferins and 35 to 60% napins and having a solubility of at least 88% when measured over a pH range from 3 to 10 at a temperature of 23±2° C.; wherein the native rapeseed protein isolate comprises from 5% to 65% on dry matter of 12S rapeseed protein where the presence of 12S is verified by Blue Native PAGE. Preferably, the native rapeseed protein isolate comprises from 10% to 65%, most preferably from 15% to 65%, especially from 25% to 65% and most especially from 35% to 65% (on dry matter) of 12S rapeseed protein where the presence of 12S is verified by native PAGE. As outlined above, a certain content of 12S proteins is not necessarily the same as cruciferins as the cruciferin 300 kDa 12S hexamer can dissociate into 7S trimeric molecules of 150 kDa.

In one embodiment, the native rapeseed protein isolate has a solubility of at least 88%, preferably at least 90%, more preferably at least 94% and most preferably at least 96% when measured over a pH range from 3 to 10 at a temperature of 23±2° C. This is also known as the soluble solids index (SSI).

For use in human food consumption the native rapeseed protein isolate preferably comprises a low level of salt. This can be established by measuring the conductivity. Preferably the conductivity of the native rapeseed protein isolate in a 2 wt. % aqueous solution is less than 9,000 µS/cm over a pH range of 2 to 12. More preferably the conductivity of the native rapeseed protein isolate in a 2 wt. % aqueous solution is less than 4,000 µS/cm over a pH range of 2.5 to 11.5. For comparison, the conductivity of a 5 g/l aqueous sodium chloride solution is around 9,400 µS/cm.

In another embodiment, the native rapeseed protein isolate has a phytate level less than 0.4 wt. %, more preferably less than 0.3 wt. % and most preferably less than 0.15 wt. %.

In still another embodiment, the native rapeseed protein isolate has a protein content of at least 90 wt. % (calculated as Kjeldahl N×6.25) on a dry weight basis, more preferably at least 94 wt. %, most preferably at least 96 wt. % and especially at least 98 wt. %.

Preferably the native rapeseed protein isolate is substantially unhydrolyzed. By substantially unhydrolyzed is meant that the protein is not deliberately hydrolyzed.

Preferably the rapeseed protein isolate is obtained in a process comprising the steps of:
i) mixing cold-pressed rapeseed oil meal with an aqueous liquid at a temperature of from 45 to 65° C.;
ii) separation of the aqueous liquid from the mixture obtained in step i);
iii) decreaming of the aqueous liquid obtained in step ii);
iv) adjusting the pH of the decreamed aqueous liquid obtained in step iii) to neutral by adding acid or base, and mixing with a precipitant to obtain a precipitate;
v) removing the precipitate obtained in step iv) to obtain an aqueous liquid;
vi) concentrating and washing the aqueous liquid obtained in step v);
vii) isolating native rapeseed protein isolate from the concentrated and washed aqueous liquid obtained in step vi) by means of drying.

As outlined above, the rapeseed protein isolate is produced from cold pressed rapeseed press meal, the by-product of rapeseed oil production.

The process starts with an extraction step i), in which rapeseed meal is combined with an aqueous salt solution, for example 0 to 5% sodium chloride, at a temperature between 4 to 75° C., more preferably 20 to 75° C. and most preferably 45 to 65° C. Preferably, in step i) said mixing is carried out such that the ratio between said cold-pressed rapeseed oil meal and said aqueous liquid is from 1:2 to 1:30 (w/w). Preferably the meal to water ratio is in the range of from 1:5 to 1:40, more preferably 1:5 to 1:20.

After a period in the range of from 5 min to 2 hours the protein rich solution is separated from the insoluble material in the separation step ii). The protein rich solution is hereafter referred to as the extract.

The pH of the extract is preferably adjusted to neutral and the extract is further processed to clarify the material and remove non-protein substances. In the decreaming step iii), the residual fat and formed precipitates are removed via a solid/liquid separation step (e.g. filtration or centrifugation). Preferably, the decreaming in step iii) is carried out by means of centrifugation.

The extract is then concentrated and washed in an ultrafiltration/diafiltration (UF/DF) step vi). The UF/DF step has the purpose of concentrating the protein and removing anti-nutritional factors (e.g. polyphenols, residual phytate, glucosinolates). The concentrating and washing in step vi) is preferably carried out by means of ultrafiltration and diafiltration.

Finally, in step vii), the washed concentrate may be dried in a suitable dryer, such as a spray drier (single or multi-stage) with an inlet temperature in the range of from 150 to 200° C. and an outlet temperature in the range of from 50 to 100° C. resulting in the rapeseed protein isolate.

Preferably the rapeseed protein isolate is obtained in a process without a fractionating step for separating out cruciferins and napins.

Preferably the rapeseed protein isolate is obtained in a process where the levels of napin and cruciferin are kept substantially constant (i.e. neither the napin (2S) or cruciferin (12S) levels are deliberately increased).

Surprisingly it was found that germ filtration of the extract before concentration was not required to obtain the low microbe concentrations of the first aspect of the invention. Furthermore, the concentrate showed good microbial stability. Although the microbial levels of the material before the removal of non-protein substance by centrifugation were above $1*10^5$ CFU/ml, after removal, preferably after precipitation and centrifugation to remove the precipitated material, the levels dropped below the $1*10^2$ CFU/ml. This means that further processing to reduce the microbial count, for example by microfiltration is not required.

The process of the instant invention is characterized in that it is well-suited for large-scale application. Hence, in one embodiment the process is carried out at a scale of at least 500 kg, preferably of from 500 to 10,000 kg or from 1,000 to 5,000 kg in a period of from 2 to 10 hours.

In another embodiment of the invention there is provided a process for obtaining food grade soluble native rapeseed protein isolate and use of the food grade soluble native rapeseed protein isolate in a food product.

In a second aspect, the native rapeseed protein isolate may be used in any human nutritional food applications including as a foaming agent to replace egg whites, as an emulsifying agent to replace for example egg yolk in mayonnaise and simply as a nutritional component providing an excellent amino acid profile. Hence, the invention provides the use of a native rapeseed protein isolate according to the first aspect of the invention as a foaming agent for food products or as an emulsifying agent for food products.

In a third aspect, the invention provides a food product or a pet food product comprising a native rapeseed protein isolate according to the first aspect of the invention.

In one embodiment, the invention provides the use of an emulsion in pet food products that comprise from 5% to 35% of native rapeseed protein isolate by weight of the pet food product, preferably from 25% to 30%. Native rapeseed protein isolate can be used as a gluten-replacing ingredient in pet food, which is advantageous as some pets can be sensitive to gluten. The term "pet food" means any composition intended to be consumed by a pet. Meat or fish pet food can be a meat or fish emulsion product having a realistic meat- or fish-like image. The rapeseed protein isolate can be added to the meat or fish material before and/or after the meat or fish material is emulsified as described in e.g. WO 2015/114543. The pet can be any suitable animal, such as avian, bovine, canine, equine, feline, hircine, lupine, murine, ovine, or porcine animal.

EXAMPLES

Test Methods

Protein Content

Protein content was determined by the Kjeldahl method according to AOAC Official Method 991.20 Nitrogen (Total) in Milk, using a conversion factor of 6.25 was used to determine the amount of protein (% (w/w)).

Conductivity

The conductivity of native rapeseed protein isolate in a 2 wt. % aqueous solution was measured using a conductivity meter: Hach sensION$_+$ EC71.

Solubility Test:

The below solubility test is adapted from Morr et al. (J. Food Sci. (1985) 50, 1715-1718), the difference being the use of water instead of 0.1 M sodium chloride.

Sufficient protein powder to supply 0.8 g of protein was weighed into a beaker. A small amount of demineralized water was added to the powder and the mixture was stirred until a smooth paste was formed. Additional demineralized water was then added to make a total weight of 40 g (yielding a 2% w/w protein dispersion). The dispersion was slowly stirred for at least 30 min using a magnetic stirrer. Afterwards the pH was determined and adjusted to the desired level (2, 3, 4, etc.) with sodium hydroxide or hydrochloric acid. The pH of the dispersion was measured and corrected periodically during 60 minutes stirring. After 60 minutes of stirring, an aliquot of the protein dispersion was reserved for protein content determination (Kjeldahl analysis). Another portion of the sample was centrifuged at 20,000 g for 2 min. The supernatant and pellet were separated after centrifugation. The protein content was also determined by Kjeldahl analysis.

Protein solubility (%)=(protein in supernatant/protein in total dispersion)×100.

Alternative methods for determining solubility are available and in some case use buffers, like borate-phosphate buffer in WO 2011/057408. However, such as values are incomparable with the ones obtained in the instant application that are determined in the absence of buffer.

MW Determination by Blue Native PAGE

In the case of Native PAGE the protein charge has an impact on the electrophoretic mobility. In the case of Blue native PAGE (and to the contrary of clear native PAGE), the Coomassie Brilliant Blue dye provides the necessary charges to the protein complexes for the electrophoretic separation.

The proteins were dissolved in 500 mM sodium chloride. As high salt concentrations are incompatible with electrophoretic separation, the sample was diluted 10-fold with water (final salt concentration: 50 mM). Coomassie® G-250 (SimplyBlue™, ThermoFischer Scientific) was used and gels were scanned with an ExQuest™ Spot Cutter (BioRad). Resultant bands after carrying out Blue Native PAGE were observed. It would be expected that bands around 14 kDa indicate 2S, around 150 kDa indicate 7S and around 300 kDa indicate 12S proteins.

Cruciferin/Napin (C/N) Ratio

The C/N ratio was determined by Size Exclusion Chromatography (SEC) analysis. Samples were dissolved in a 500 mM sodium chloride saline solution and analyzed by HP-SEC using the same solution as the mobile phase. Detection was done by measuring UV absorbance at 280 nm. The relative contribution of cruciferin and napin (%) was calculated as the ratio of the peak area of each protein with respect to the sum of both peak areas.

Phytate Level

Phytates were measured at Eurofins using method QD495, based on Ellis et al. (Anal. Biochem. (1977) 77, 536-539).

Example 1

Preparation of Rapeseed Protein Isolate from Cold-Pressed Rapeseed Oil Seed Meal The rapeseed protein isolate was produced from cold-pressed rapeseed oil seed meal having an oil content of less than 15% on dry matter basis, cleaned and processed below 75° C.

In the extraction step, the cold-pressed rapeseed oil seed meal was mixed with an aqueous salt solution (1 to 5% sodium chloride), at a temperature between 40 to 75° C. The meal to aqueous salt solution ratio was in the range of from 1:5 to 1:20. After about 30 minutes to 1 hour the protein rich solution (extract) was separated from the insoluble material.

The pH of the extract was adjusted to neutral and the extract was further processed to clarify the material and remove non-protein substances. In the decreaming step, the residual fat was removed via a liquid/liquid separation step using centrifugation. Non-protein substances were removed by adjusting the pH of the material to neutral in the presence of a salt with which phytate precipitates (e.g. calcium chloride). The formed precipitate is removed via a solid/liquid separation step (e.g. a membrane filter press or centrifugation) in which the impurities are removed in a solid salt form (e.g. calcium phytate). The extract was then concentrated and washed in an ultrafiltration/diafiltration (UF/DF) step. Finally, the washed concentrate was dried in a spray drier with an inlet temperature in the range of from 150 to 200° C. and an outlet temperature in the range of from 50 to 100° C. resulting in the rapeseed protein isolate. Several batches were prepared and tested.

The conductivity of the resultant native rapeseed protein isolates in a 2% solution was less than 4,000 µS/cm over a pH range of 2.5 to 11.5.

Blue Native PAGE: Main bands were observed roughly around 300 kDa, between the 242 and 480 kDa MW markers (FIG. 1). Some staining was visible as a smear as lower MW (150 kDa and below). No clear bands were observed at 150 kDa. Based on these results, the rapeseed product contains the 12S form of cruciferin.

The resultant native rapeseed protein isolate comprised in the range of from 40 to 65% cruciferins and 35 to 60% napins.

The resultant native rapeseed protein isolate contained less than 0.26 wt. % phytate.

The resultant native rapeseed protein isolates had a solubility of at least 88% when measured over a pH range from 3 to 10 at a temperature of 23±2° C. as shown for two batches in the below table.

|  | pH | | | | | | | |
| --- | --- | --- | --- | --- | --- | --- | --- | --- |
|  | 3 | 4 | 5 | 6 | 7 | 8 | 9 | 10 |
| Sample 1 Solubility (%) | 98 | 96 | 89 | 95 | 95 | 97 | 97 | 98 |
| Sample 2 Solubility (%) | 102.5 | 97.5 | 94.3 | 93.9 | 97.0 | 93.0 | 94.0 | 99.8 |

The invention claimed is:

1. A native rapeseed protein isolate comprising 40 to 65 wt % cruciferins and 35 to 60 wt % napins and having a solubility in water of at least 88% when measured over a pH range from 3 to 10 at a temperature of 23±2° C.; wherein the native rapeseed protein isolate comprises from 25% to 65% on dry matter basis of 12S rapeseed protein where the presence of 12S is verified by Blue Native PAGE.

2. The native rapeseed protein isolate according to claim 1 having a conductivity in a 2 wt. % aqueous solution of less than 9,000 µS/cm over a pH range of 2 to 12.

3. The native rapeseed protein isolate according to claim 1 comprising at least 35% on dry matter basis of 12S rapeseed protein.

4. The native rapeseed protein isolate according to claim 1 comprising less than 20% on dry matter basis of 7S rapeseed protein.

5. The native rapeseed protein isolate according to claim 1 with a cruciferin/napin ratio in the range of from 0.9 to 1.3.

6. The native rapeseed protein isolate according to claim 1 with a phytate level less than 0.4 wt. %.

7. The native rapeseed protein isolate according to claim 1 with a solubility of at least 94% when measured over a pH range from 3 to 10 at a temperature of 23±2° C.

8. A food product or a pet food product comprising the native rapeseed protein isolate according to claim 1.

9. A pet food product according to claim 8 that comprises from 5% to 35% wt % of the native rapeseed protein isolate.

* * * * *